Nov. 15, 1955   R. C. FERGASON   2,723,769
CROP LOADING AND UNLOADING HARVESTER
Original Filed Sept. 10, 1949   6 Sheets—Sheet 1

Inventor
Rector C. Fergason
by
Attorney

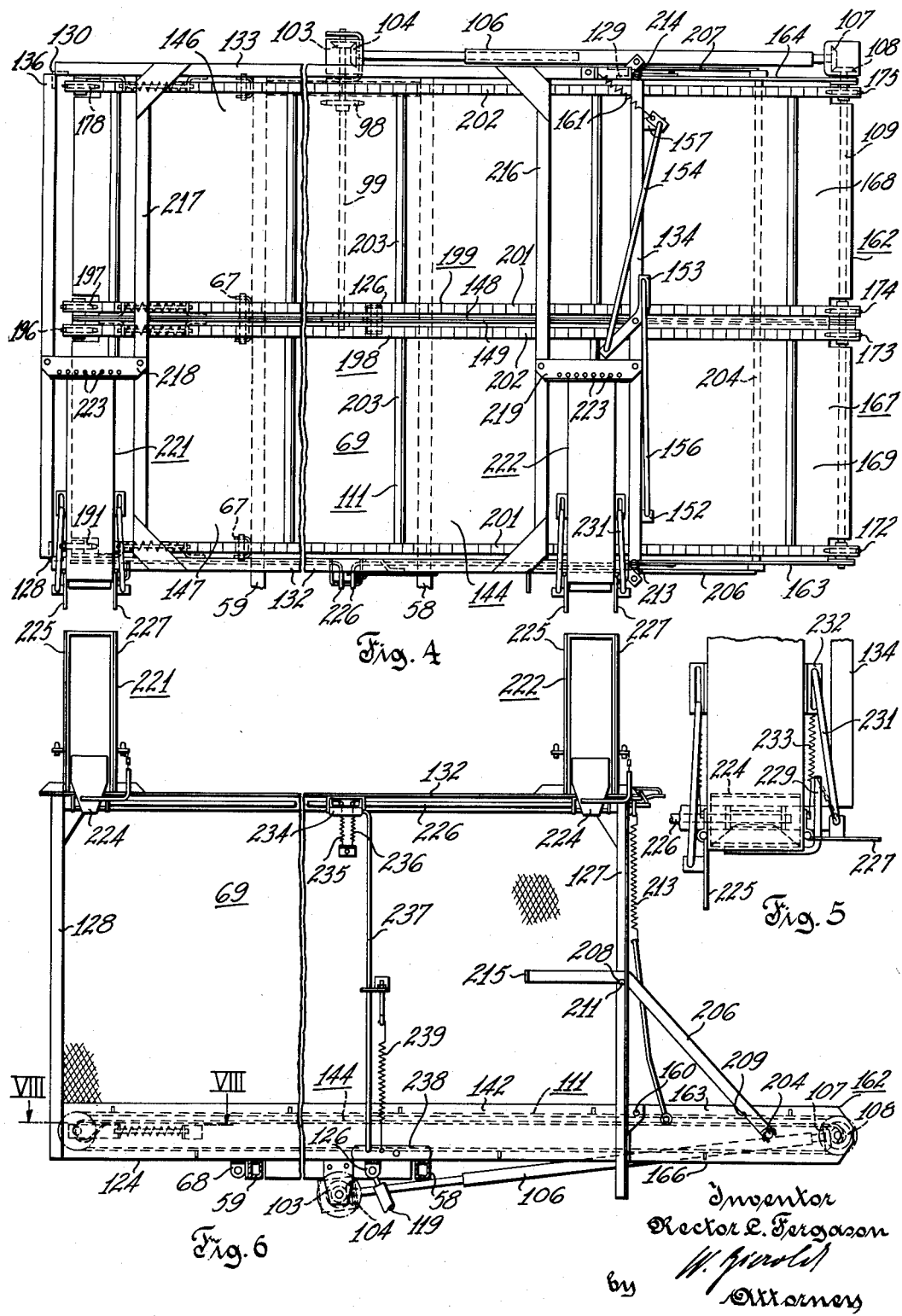

Nov. 15, 1955  R. C. FERGASON  2,723,769
CROP LOADING AND UNLOADING HARVESTER
Original Filed Sept. 10, 1949  6 Sheets-Sheet 5
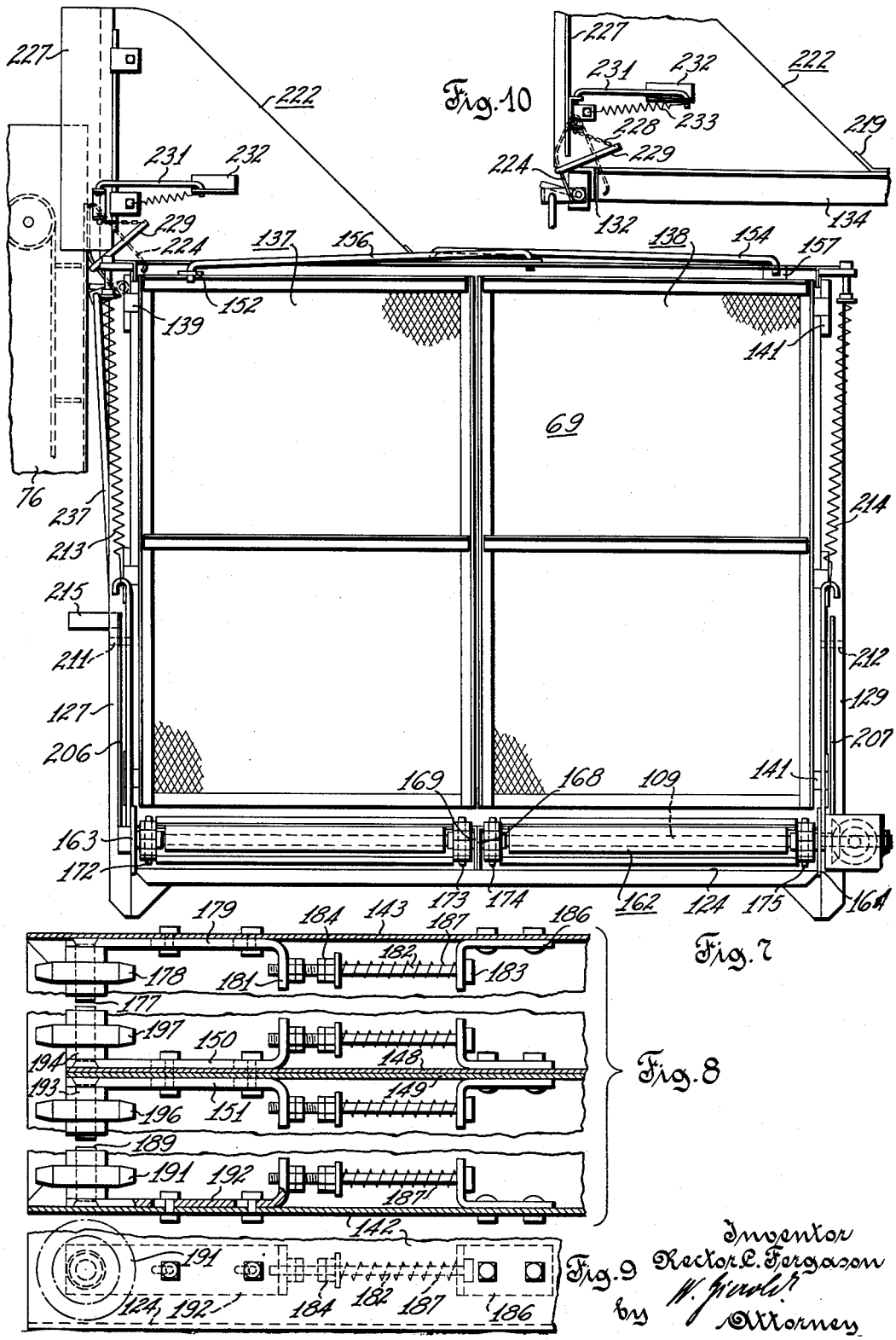

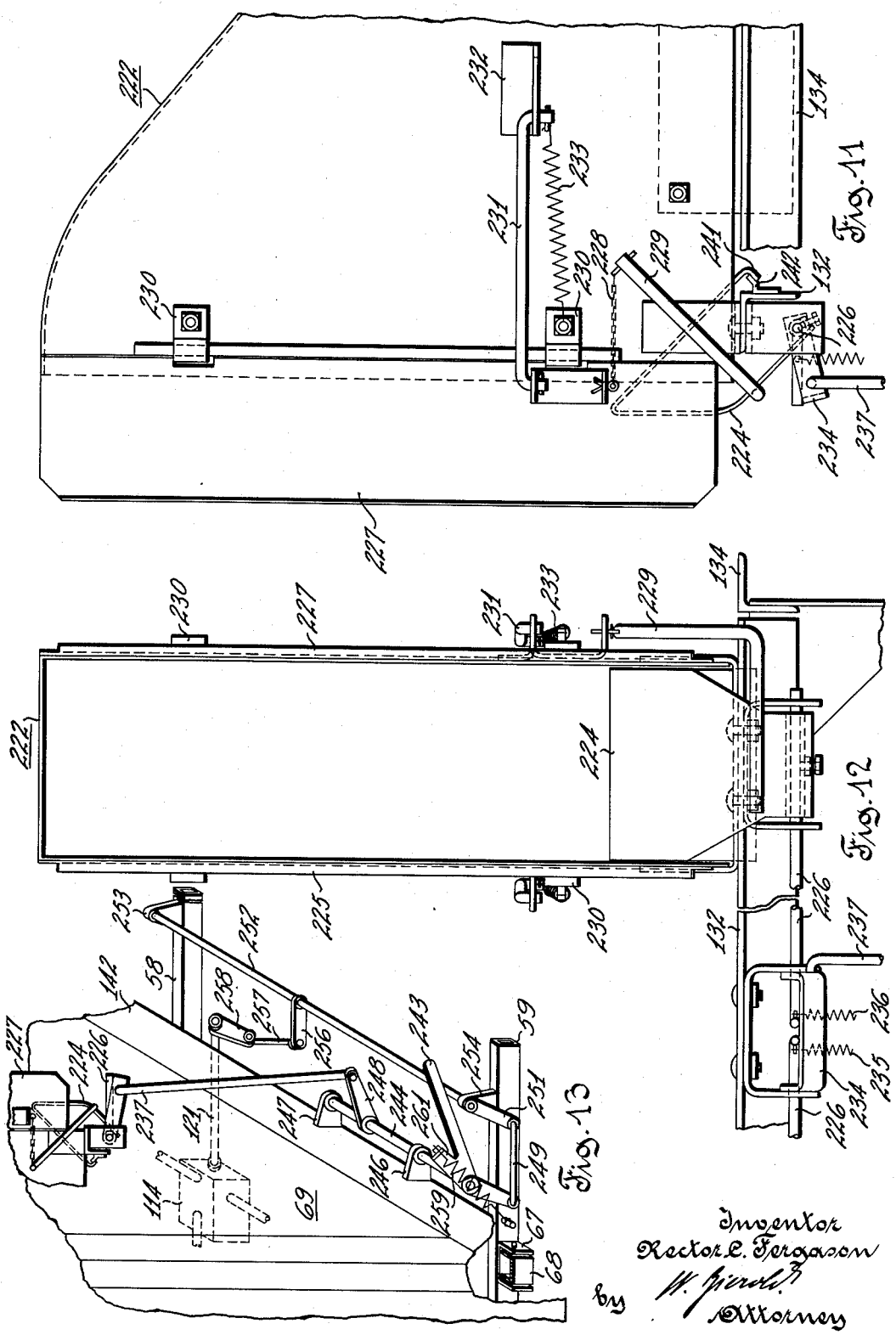

United States Patent Office 2,723,769
Patented Nov. 15, 1955

2,723,769

CROP LOADING AND UNLOADING HARVESTER

Rector C. Fergason, Gadsden, Ala., assignor to Allis-Chalmers Manufacturing Company, Milwaukee, Wis.

Original application September 10, 1949, Serial No. 114,969, now Patent No. 2,671,298, dated March 9, 1954. Divided and this application March 4, 1954, Serial No. 414,013

16 Claims. (Cl. 214—508)

This invention relates to harvesting machines, and it is concerned more particularly with the provision of a receptacle in which harvested material may be stored temporarily during the harvesting operation and from which the material may readily be discharged at desired intervals. The present application is a division of application S. N. 114,969 filed on September 10, 1949 for Cotton Picker, and on which U. S. Patent 2,671,298 has been issued on March 9, 1954.

The use of tractor propelled machines to harvest crops at a relatively high rate of speed has created a necessity for a large receptacle in which the harvested material may be collected. This problem is particularly acute in the harvesting of cotton due to the large bulk of the cotton in comparison to its weight, and the consequent need for a relatively large receptacle. In order to save time and to make the harvester more productive, it is desirable to have a simple, positive and speedy system of loading and unloading the receptacle so that too frequent and time consuming stops for taking care of the harvested material may be avoided.

In actual operation, the cotton receiving receptacle is usually unloaded into an awaiting truck or wagon. Heretofore, the common practice has been to position the receptacle at a height sufficient to clear the sides of a truck or wagon and the unloading has been accomplished by tipping the receptacle after it has been extended away from the harvester. This practice has certain disadvantages, the most important of which is the large amount of weight which is concentrated in the receptacle at this height. This weight raises the center of gravity of the entire machine as the receptacle becomes loaded thereby lessening the stability of the machine when it is operating on rough or hilly ground. In addition, this manner of emptying the receptacle requires a complicated structure in order to tilt and shift the receptacle up and over to the awaiting wagon or truck.

It has been attempted to overcome these difficulties by mounting the receptacle at the rear or the side of the harvester. However, these mountings have not been found to be entirely satisfactory because of their tendency to unbalance the machine. In addition, this lowered mounting has necessitated a more complicated mechanism for raising the receptacle and contents to a height sufficient to clear the side of a truck, wagon or other vehicle.

Generally, it is an object of this invention to provide an improved harvesting machine which will take care of the above outlined requirements and shortcomings in a simple and practical manner.

More specifically, it is an object of this invention to provide an improved crop loading and unloading harvester which will be operable to quickly and efficiently empty a harvested material receptacle on the harvester.

Another object of this invention is to provide an improved harvester of the above outlined character wherein a basket for receiving harvested material such as cotton is mounted in a position which will afford a low center of gravity both during loading and unloading operations.

A further object of this invention is to provide an improved harvester having a basket mounting of the type stated and which will allow the basket to be emptied without necessitating the movement of the basket to one or the other side of the harvesting machine.

A further object of the invention is to provide an improved system for placing a tiltable basket into and out of communication with the discharge end of a basket loading device, such as an elevating conveyer; and more particularly to provide the basket with an improved adjustable duct structure which will guide material from the loading device into the basket and which will be automatically operated to clear the loading device during movement of the basket from its loading to its unloading position.

These and other objects and advantages are obtained by the present invention, various novel features of which will be apparent from the description herein and the accompanying drawings disclosing an embodiment of the invention, and will be more particularly pointed out in the appended claims.

Referring to the drawings:

Fig. 4 is an enlarged fragmentary plan view of the cotton receiving basket of the harvester shown in Figs. 1 and 2;

Fig. 5 is an enlarged partial plan view of an elevator hood forming part of the harvester shown in Figs. 1 and 2;

Fig. 6 is a side elevation of the basket shown in Fig. 4;

Fig. 7 is an enlarged end elevation of the basket shown in Fig. 4, the view of Fig. 7 looking toward the basket in the same direction as Fig. 2 but showing the basket in a different condition of adjustment;

Fig. 8 is a fragmentary, sectional view on line VIII—VIII of Fig. 6 showing a floor conveyer chain tightening and releasing mechanism for the basket shown in Figs. 4, 6 and 7;

Fig. 9 is a side view of the apparatus shown in Fig. 8;

Fig. 10 is a partial view of a basket hood and associated mechanism shown in Fig. 7, movable parts shown in one position of adjustment in Fig. 7 being shown in a different position of adjustment in Fig. 10;

Fig. 11 shows an enlarged detail view of a hood part and associated mechanism shown in Fig. 7;

Fig. 12 is an end view of the hood assembly shown in Fig. 11; and

Fig. 13 is a perspective view of the forward side of the basket and support frame, therefore, showing a modified construction.

Figure 1:
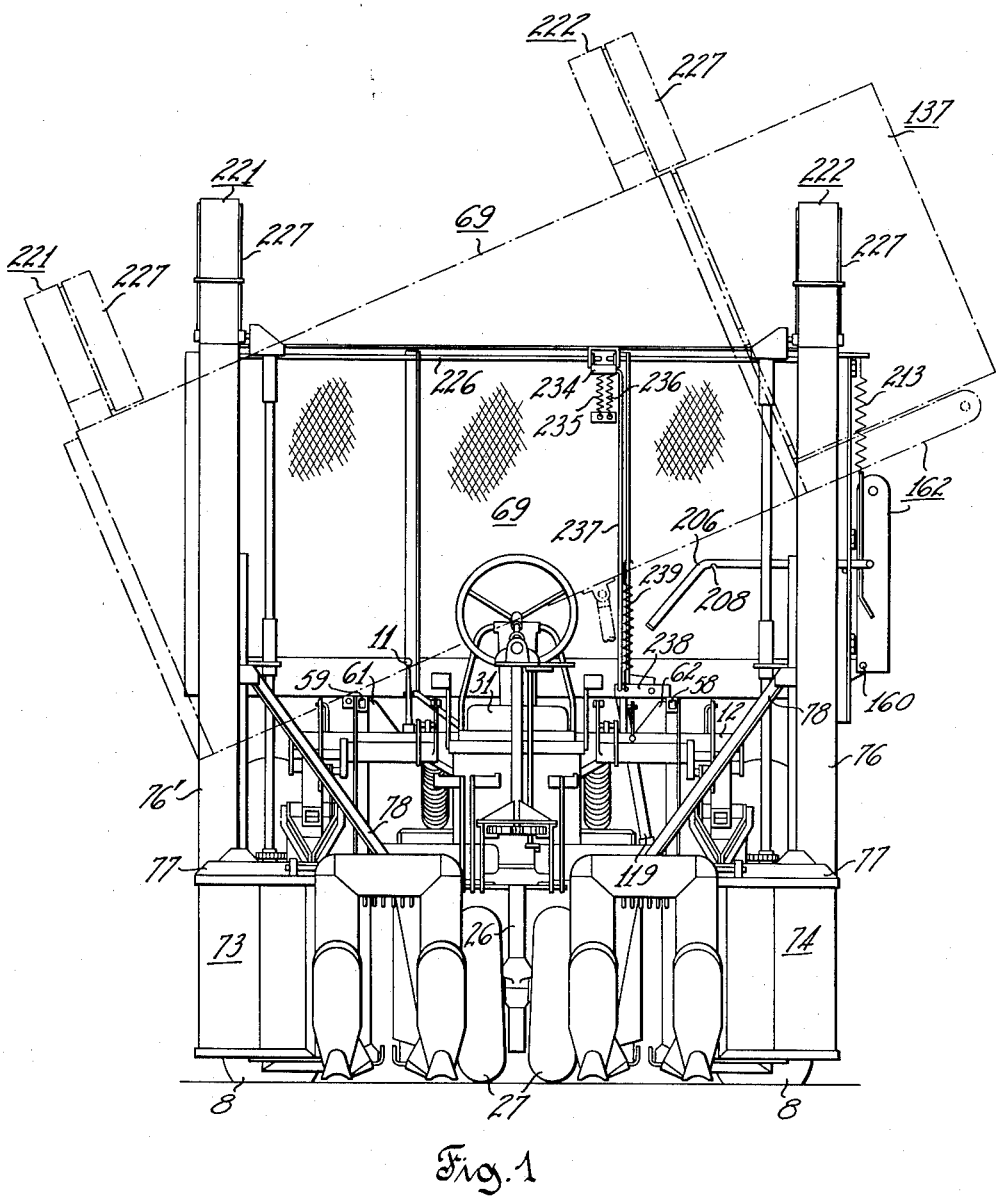
Fig. 1 is a front view of a cotton harvester including an upwardly tiltable cotton receiving basket, the unloading position of the basket being shown in dash-dotted lines.
Figure 2:
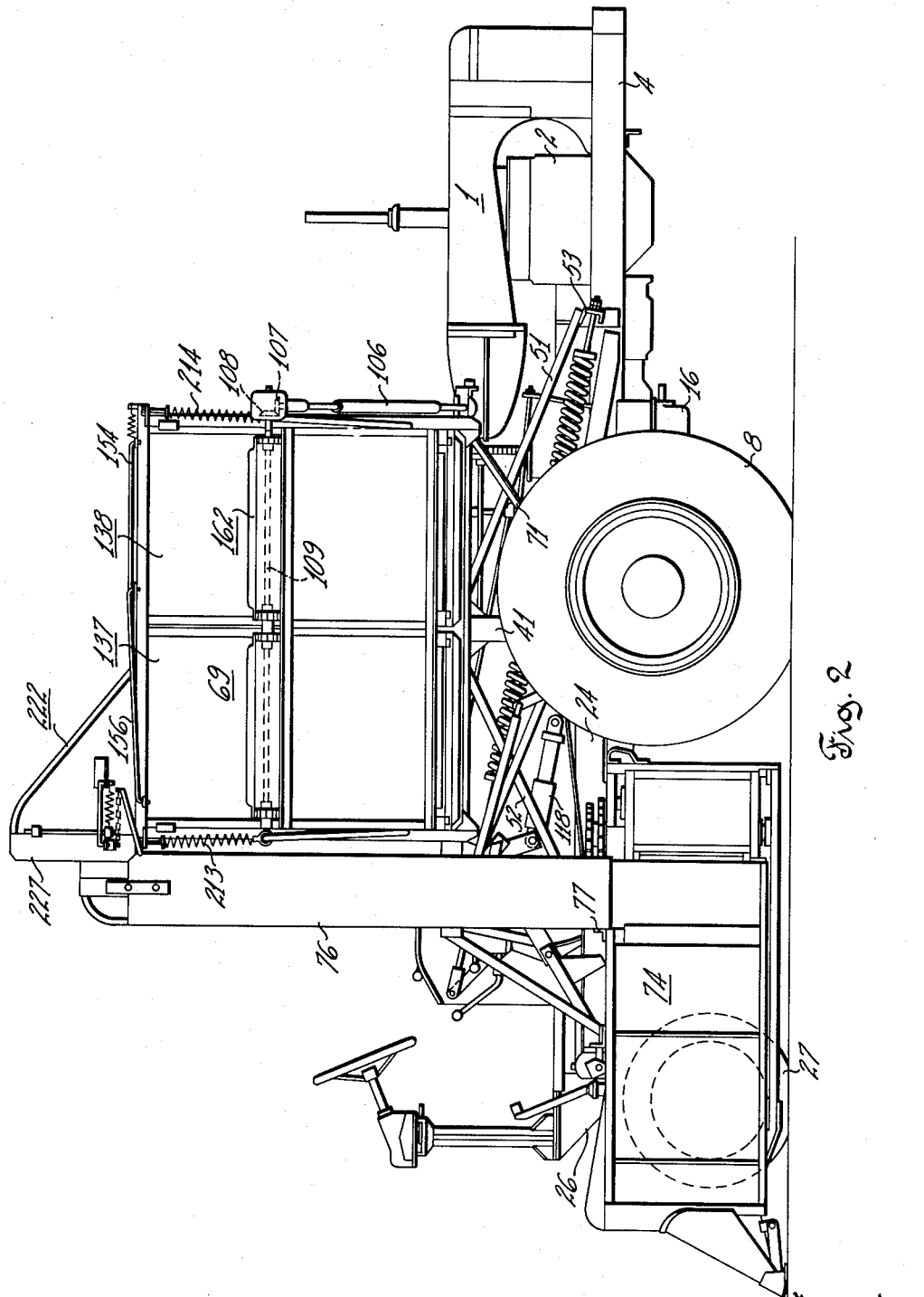
Fig. 2 is a side view of the cotton harvester shown in Fig. 1.
Figure 3:
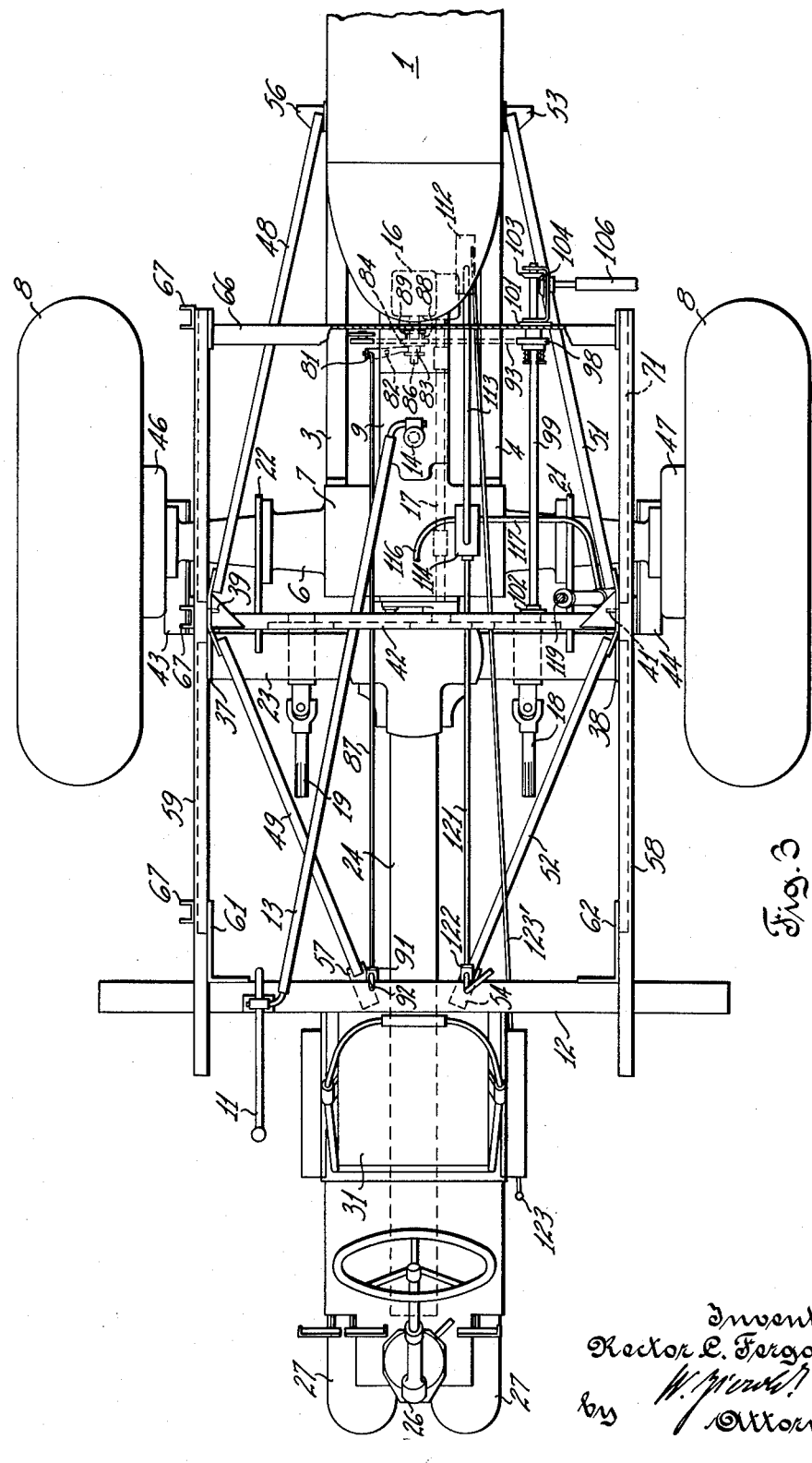
Fig. 3 is a chassis view, in plan, of the cotton harvester shown in Figs. 1 and 2.

Referring to Figs. 1, 2 and 3, a tractor 1 has a rearwardly located engine 2 supported on frame members 3 and 4 which are joined at their forward ends to a transverse axle housing 6 and supported thereby as a cantilever beam. This axle housing is of the drop type and has a central or intermediate portion 7 which encloses a conventional differential mechanism, not shown. The axles of the traction wheels 8 are driven by the differential mechanism and the latter is supplied with power from the engine 2 by a transmission shaft and change speed transmission (not shown) located in a transmission housing 9. A hand shift lever 11 (Fig. 3) operatively mounted on a forward, transverse frame tube 12, is connected by means of a link 13 to a transmission gear shift lever 14 which is pivotally carried by transmission housing 9. A power take-off device 16 driven by the transmission serves to drive a shaft 17 and power outlet connections 18 and 19 which will be described later.

Removably connected to axle housing 6 by means of a pair of tie plates 21 and 22 is a T-shaped pipe frame having a transverse portion 23 extending generally parallel in spaced relation to axle housing 6, and a longitudinally extending central frame member 24 having the forward end thereof connected to a front steerable support 26 mounting a pair of ground engaging wheels 27. The longitudinally extending central frame member 24 and the forward transverse frame tube 12 are rigidly connected together by a suitable system of brace members, not shown, which extend upwardly from the longitudinal frame member 24 and sustain the transverse frame tube 12 at a level above the longitudinal frame member 24, the elevated position of the transverse tube 12 being shown in Fig. 1. An operator's seat 31 is suitably supported above the central frame member 24 as shown in Figs. 1 and 3.

Connected to the opposite ends of the rear transverse pipe member 23, as by welding, are upwardly extending plate members 37 and 38 which are supportingly connected to upright channel members 39 and 41. The upper ends of channel members 39 and 41 are joined by a cross member 42, and lower braces 43 and 44 are connected by bolting to the lower ends of channel members 39 and 41 and to axle housing depending side portions 46 and 47. Diagonal brace rods 48, 49 at the right side of the machine, and diagonal brace rods 51, 52 at the left side of the machine extend from the upper ends of channel members 39 and 41 to clips 53, 54 at the left side, and to clips 56, 57 at the right side, respectively, of the machine, the terms "left" and "right" being used in conformity with the orientation of an operator looking forwardly from seat 31.

A pair of horizontal, longitudinally extending basket support frame members 58 and 59 are supported at their approximate midportions by channel members 39 and 41 at the upper ends of the latter. The forward portions of frame members 58 and 59 are supported on transverse tube 12 by triangular brace plates 61 and 62, as shown in Fig. 1. The rear ends of frame members 58 and 59 are rigidly united by a basket supporting cross frame member 66. Three channel shaped hinge brackets 67 are fixedly secured to longitudinally spaced portions of frame member 59, these brackets pivotally receiving hinge blocks 68 (see Fig. 6) attached to the frame of basket 69. As shown in Fig. 2, a forwardly and downwardly extending brace rod 71 is secured at its upper end to basket supporting cross frame member 66, and the forward end (not shown) of this brace rod is secured to the plate 38. A similar brace (not shown) is connected between the right end of cross frame member 66 and plate 37.

A pair of cotton picking units 73 and 74 (best seen in Figs. 1 and 2) are adjustably suspended from opposite ends of the forward, transverse frame tube 12. Each of the picking units comprises an up and down adjustable frame structure and an endless series of spindle slats (not shown) which are mounted on the frame structure of the picker unit for travel in an oblong path, the construction and mode of operation of the picking units conforming generally with wellknown principles. Suitable mechanisms (not shown) for driving the spindle slats of the picking units 73 and 74 are drivenly connected with power outlet connections 18 and 19, respectively (Fig. 3), which in turn are drivenly connected with the power take-off device 16 by means of the longitudinally extending shaft 17 (Fig. 3).

A pair of picked material elevating conveyers 76 and 76' (Figs. 1 and 2) are carried, respectively, by the picking units 74 and 73, and are suitably braced by horizontally extending angle irons 77 best seen in Fig. 1 and by upwardly extending inclined braces 78. An endless belt type conveyer element (not shown) is housed within the chute of each elevating conveyer and is driven by the slat driving mechanism of its associated picking unit. The picked cotton after being elevated to the top of either elevating conveyer is discharged into the basket 69, the details of which will appear herein below. Further details of the structure and operation of the picking units and cotton elevating mechanism may be found in the above mentioned U. S. Patent 2,671,298, issued March 9, 1954.

The power take-off device 16 (Fig. 3) is bolted to transmission housing 9 and to tractor frame member 4 by means of a tie plate (not shown), and a power take-off shaft 86 extends forwardly from the housing of the power take-off device 16. A double armed lever 81 is pivotally mounted on a vertical stub shaft 82 and has a bifurcated end which is adapted to be received within a peripheral groove of the hub 83 of a sprocket wheel 84 which is rotatable and axially shiftable on shaft 86. Sprocket wheel 84 is movable into driven relation with shaft 86 by pivoting lever 81 about shaft 82 which causes a clutch element 88 on sprocket 84 to engage a clutch element 89 on shaft 86. An operating rod 87 for lever 81 is slidably supported on a bracket 91 carried by the forward transverse frame tube 12 and has an operating handle 92 adjacent operator's seat 31.

Sprocket wheel 84 provides a power take-off which is readily controlled from the operator's station. A chain 93 is trained about sprocket wheel 84, and about a sprocket 98 which is mounted on a shaft 99 journaled in brackets 101 and 102 carried by cross frame member 66 and cross member 42, respectively. Shaft 99 mounts a bevel gear 103 in mesh with a bevel gear 104 secured to the adjacent end of a telescoping shaft 106. The opposite end of shaft 106 mounts a bevel gear 107 (see Fig. 2) in mesh with a bevel gear 108 attached to the adjacent end of a rotatable shaft 109 for driving a floor conveyer 111 (see Fig. 4) of basket 69, the details of which basket and conveyer will be hereinafter described.

A hydraulic pump 112 (Fig. 3) is supported on transmission housing 9 and driven by engine 2 through conventional mechanism not shown. A flexible pipe 113 hydraulically connects the pump 112 to a three way valve 114 for selectively controlling the flow of fluid through tubes 116 and 117 which are connected, respectively, with a picker unit raising ram 118 (Fig. 2) and with a basket elevating ram 119 (Fig. 3), respectively, the latter being pivotally carried by transverse tube 23. A three way valve 114 has a control element 121, the operating end of which is slidably carried by a bracket 122 supported by tube 12 adjacent the operator's station. Control element 121 can be actuated to operate either ram 118 or ram 119. A control element 123 carried by tube 12 is connected to pump 112 by means of a rod 123' and controls same for raising or lowering either ram as desired or maintaining either ram in any desired position of adjustment. It is understood that the three way valve 114 must be properly positioned to establish a hydraulic connection with the ram desired to be raised, lowered or held in a selected position. A modified means for operating the three way valve 114 will be fully explained presently.

With reference to Figs. 4, 6 and 7, the basket or receptacle 69 comprises an open topped, box like structure which is pivotally mounted on the hinge brackets 67 (Fig. 3) of the longitudinally extending frame member 59 and includes a lower floor panel or member 124 provided with a hydraulic ram attaching part 126, the active end of the ram 119 being attached to part 126. Vertically extending angle irons 127, 128, 129 and 130 are attached to the corners, respectively, of floor panel 124. Angle irons 127 and 128 are joined at their upper ends by transversely extending front frame member 132 to define a generally rectangular side member; and angle irons 129 and 130 are similarly joined at their upper ends by rear frame member 133 to define a generally rectangular rear side member in spaced relation to front frame member 132. Upper end frame member 134 connects angle irons 127 and 129 at their upper ends to define the discharge opening of basket 69, and end frame member 136 connects angle irons 128 and 130 at their upper ends to define a vertical end member of the basket. Three of the vertical sides of basket 69 have wire mesh attached to the frame members and the angle irons making up the frame structure of the basket. The fourth vertical side of the basket, which is shown in elevation in Figs. 2 and 7, is closed by doors or end gates 137 and 138 which are pivotally mounted on angle irons 127 and 129, respectively, by means of hinges 139 and 141.

Vertical plate members 142 and 143 at the front and rear sides, respectively, of the basket (Figs. 6 and 8) are attached to floor member 124 and angle irons 127, 128, 129 and 130, respectively, in generally parallel relation to top members 132 and 133. An upper floor panel 144 (Fig. 6) overlying floor panel 124 in spaced relation thereto is constructed of two sections 146 and 147 (Fig. 4) having bent over inner opposed edge portions 148 and 149 (Fig. 8) disposed in abutting relation between and supported by flanges 150 and 151 (Fig. 8) carried by floor panel 124, and having turned over outer edge portions (not shown) attached in side abutting relation to plates 142 and 143, respectively, thereby positioning upper floor panel 144 in spaced elevated relation to lower floor 124.

A bell crank lever 153 (see Fig. 4) is pivotally supported on the top side of frame member 134 and has one arm pivotally connected with the forward end of a rearwardly extending rod 154 and has its other arm pivotally connected with the rear end of a forwardly extending rod 156. The rear end of rod 154 is pivotally attached to a flange 157 carried by door 138 and the front end of rod 156 is pivotally connected to a flange 152 carried by door 137. An overcenter spring 161 has one end pivotally attached to flange 157 and has its other end connected to frame member 133. When the doors are closed as indicated in Fig. 7, spring mechanism 161 acts to yieldably hold the doors in their closed position, and when the doors are open as indicated by the dotted line position of the basket shown in Fig. 1, the attachment point of spring 161 to door 138 has moved the spring past the center of hinge 141 and therefore the spring also acts to yieldably hold the doors in their open position.

Pivotally attached to the lower front and rear side plate members 142 and 143 for swinging movement on a longitudinal, horizontal axis 160 (Fig. 6) is a floor or end extension 162 (Fig. 6) comprising a pair of side members 163 and 164 (Fig. 4) mounting a lower floor panel 166, side members 163 and 164 being aligned with plate members 142 and 143, respectively, and lower floor panel 166 being aligned with lower main floor panel 124 when the floor extension 162 is in its lowered position as shown in Fig. 4. The swingable floor extension 162 further comprises an upper floor panel 167 constructed of two sections 168 and 169 (Fig. 7) having turned over inner edge portions joined together in supporting relation to lower extension floor panel 166 and each having a turned over outer edge portion (not shown) attached in side abutting relation to side members 163 and 164, respectively, thereby positioning the upper extension floor panel 167 in spaced elevated relation to lower extension floor panel 166 and in alignment with the upper panel of the basket floor when the floor extension 162 is in its lowered or discharge position. It will be noted that the end extension 162 is pivotally mounted adjacent the bottom edge of the basket discharge opening defined by angle irons 127, 129 and by upper floor panel 144. This pivotal mounting enables the end extension 162 to be tilted to a vertical position in closing relation to the discharge opening of the basket as will be more fully explained hereinbelow. Journaled in the free outer ends of side members 163 and 164 is shaft 109 (Figs. 2 and 4) having sprockets 172, 173, 174 and 175 attached thereto.

As indicated in Figs. 8 and 9, a stub shaft 177 rotatably supporting a sprocket wheel 178 is carried by a bracket 179 slidably engaged with plate member 143. The end of bracket 179 remote from sprocket wheel 178 is provided with an inturned portion 181 to which is attached one end of a rod 182 having an enlarged head 183. A pair of spring tensioning nuts 184 threadingly engage a midportion of rod 182, and a bracket 186, rigidly attached to the inner side of plate mmeber 143, slidably encircles a portion of rod 182 between the head thereof and the spring tensioning nuts 184. A spring 187 surrounds rod 182 in interposed relation between bracket 186 and nuts 184. A stub shaft 189, rotatably supporting a sprocket 191, is similarly slidably attached to plate 142 with stub shaft 189 disposed in spaced axial alignment with respect to stub shaft 177, the attaching means including a bracket 192 similar to bracket 179. Stub shafts 193 and 194 carrying sprocket wheels 196 and 197, respectively, are similarly slidably attached by means of brackets 150 and 151 to the turned over portions 148 and 149 of upper floor sections 146 and 147, these two stub shafts being disposed in axial alignment with respect to each other and with respect to stud shafts 177 and 189.

Floor conveyer 111 includes in addition to shaft 109, two similar raddle sections 198 and 199, each raddle section comprising a pair of endless chains 201 and 202 connected by a plurality of transverse slats 203. The chains of section 198 pass around driving sprockets 172 and 173 and around idler sprockets 191 and 196, and the chains of section 199 pass around driving sprockets 174 and 175 and around idler sprockets 197 and 178. In this connection it will be noted that the upper floor sections 146 and 147 are curved downward at the right side of the basket and are slotted for the accommodation of idler sprockets 178, 191, 196 and 197. Likewise, at the left side of the basket, the ends of upper floor extension sections 168 and 169 are curved and slotted for the accommodation of drive sprockets 172, 173, 174 and 175. The two raddle sections 198, 199 are operable, when the pivoted floor extension 162 of the basket 69 is in its lowered position in alignment with floor member 124, to move outward over upper floor sections 146, 147, 168 and 169, down around the drive sprockets carried by conveyer shaft 109 and returned under the upper floor sections and over the bottom floors, as indicated in Fig. 6.

As shown in Figs. 8 and 9, the springs 187 urge the slidably mounted rotary supporting sprockets 178, 191, 196 and 197 towards the left in Figs. 8 and 9, that is, in conveyer tensioning direction when the floor extension 162 is in its lowered or operative position. When the floor extension 162 is swung to its raised or closed position as shown in Fig. 2, brackets 179, 150, 151 and 192 move to the right as viewed in Figs. 8 and 9 additionally compressing springs 187, this movement shifting the left hand ends of the raddle sections 198 and 199, as viewed in Fig. 6, to the right sufficiently to permit the floor extension 162 to be folded up against and positively retain basket doors 137 and 138 in closed position. Springs 187 also function as chain tighteners when the chains are in material discharge position.

Pivotally mounted in floor extension side plates 163 and 164 is a rock shaft 204 (Figs. 4 and 6) having arms 206 and 207 attached to the ends thereof for movement therewith. These arms each have two notches 208 (Fig. 1) and 209 (Fig. 6) formed therein which are adapted to engage projections 211 and 212 (Fig. 7) carried by the associated angle irons 127 and 129. The engagement of these notches with the projections 211 and 212 renders arms 206 and 207 operative to latch the floor extension 162 in either its raised or lowered position. The end of lever 206 has a bent upper end portion 215 forming a handle to engage or disengage the notches with projections 211 and 212 carried by angle irons 127 and 129. A pair of counterbalancing springs 213 and 214 (Fig. 2) are connected to the upper portion of the basket and to the floor extension side members 163 and 164, respectively, and act to reduce the force required to return the floor extension to its raised or folded transport position.

With reference to Figs. 1 and 6, it will be noted that the receptacle 69 is tiltably mounted on frame member 59 by means of the hinge blocks 68 which pivot on the hinge brackets 67 (Fig. 3), respectively; the hinge blocks 68 being secured to the floor member 124 at a predetermined transverse spacing from the left or discharge side of the basket and from the end extension 162. Upward tilting of the basket 69 and floor member 124 about the axis of the hinge blocks 68, as indicated by dash-dotted lines in Fig. 1, presents the end extension or discharge end of the basket in elevated relation to the frame member 58. Movement of harvested material upwards of floor member 124 and its discharge over end extension 162 is effected by the floor conveyer 111 which is driven by shaft 106 as hereinabove described.

A pair of longitudinal braces 216 and 217 unite intermediate opposed portions of upper frame members 132 and 133 of the basket, a pair of short transverse braces 218 and 219 connect basket frame member 134 with longitudinal brace 216, and basket frame member 136 with longitudinal brace 217.

A pair of hood structures 221 and 222 (Figs. 4 and 6) are mounted adjacent the front top corners of the basket. The hood structures are supported on and secured to transverse braces 218 and 219, respectively; and they are additionally supported on and secured to top side portions of upper frame member 132. Holes 223 are formed in the braces 218 and 219 and similar holes are formed in frame member 132 (only those in the braces being shown), and bolts for securing the hoods in place may be passed through selected ones of these holes so that the hood members can be selectively positioned to conform with the lateral adjustment of the picker units 73 and 74. A throat member 224 (Figs. 7 and 11) which functions as a guide to bridge the space between the discharge end of the elevating conveyer 76 and basket 69, is carried by an end portion of a transverse, horizontal rod 226 (Fig. 12) which in turn is pivotally supported by upper basket frame member 132 in generally parallel relation thereto. A pair of flap members 225 and 227 are mounted at opposite side portions of each hood structure by means of hinges 230 (Figs. 11 and 12) for pivotal movement about vertical axes, respectively. A chain 228 connects left hand flap 227 of the hood 222 to the upturned end portion of a rod 229 attached to the throat member 224 which is associated with hood 222. This connection is such that when the throat member 224 is pivoted to inoperative position, as shown in Fig. 10, the associated flap member 227 is also moved to inoperative position as shown in Figs. 5 and 10. The foregoing explanations with respect to the interconnection between the throat member 224 and flap member 227 of the hood structure 222 similarly apply to the throat member 224 and flap member 227 of the hood structure 221.

For the purpose of swinging the flap 227 of the hood 222 about its vertical axis, a rod 231 (Figs. 4 and 5) is pivotally connected at one end to the flap and has its opposite end slidably received in a slotted bracket 232 carried by the hood 222. A spring 233 has one end secured to the hood 222 and has its other end attached to the end of rod 231 associated with bracket 232, this spring tending to swing the flap against the housing of the elevating conveyer 76. Similar provisions are made to swing the flap 227 of the hood 221 against the housing of the other elevating conveyer 76'.

Referring to Fig. 12, the transverse rod 226 which is connected at one end to the throat 224 of the hood 222 is bent forward at its other end into overlying relation to a U-shaped bracket 234 which is pivotally mounted on an axis coincident with rod 226. The other rod 226 for operating the throat member 224 of the hood 221 is similarly bent into overlying relation with the bracket 234. Springs 235 and 236 each have one end connected to a portion of basket 69 below rods 226 and have their other ends attached to the bent ends of rods 226, thereby biasing same downwardly against the upper edge of bracket 234. Pivotally attached to bracket 234 is a vertically depending rod 237 having its lower end pivotally connected to one end of a lever 238 (see Figs. 1 and 6) pivotally mounted on plate member 142 of the basket. A spring 239 having one end attached to the basket and having its other end connected to lever 238 acts to bias this lever in a clockwise direction as viewed in Figs. 1 and 6. In the lowered position of the basket, as shown in Fig. 6, the free end of the lever 238 bears downwardly against longitudinal basket supporting frame member 58, and when the basket is raised, the spring 239 functions to pivot lever 238 in a clockwise direction, thereby raising rod 237 and bracket 234, the latter in turn raising the forwardly bent ends of rods 226 thereby moving the two throat members 224 and flaps 227 out of contact with elevating conveyers 76 and 76'. When the basket is lowered, the free end of lever 238 contacts frame member 58, which causes lever 238 to pivot against the bias of spring 239 thereby pulling rod 237 and bracket 234 downward, the latter tending to move away from the bent ends of rods 226. However, spring 235 and 236 effect a following pivotal movement of rods 226 and a consequent movement of throat members 224 to their operative positions in contact with elevators 76 and 76', the elevator housings serving as additional stops for limiting the movement of these parts as effected by the downward pull of springs 235 and 236. As the throat members swing forward to operative positions, chains 228 tend to become slack which permits springs 233 to effect a return of the hood flaps to their operative positions vertically bridging the space between the discharge end of the elevating conveyer and basket. It will be noted with reference to Fig. 11 that throat member 224 has a turned over portion 241 which coacts with a flange 242 attached to frame member 132 to limit forward swinging movement of throat member 224 independently of the associated elevator housing.

The operation of the hood flaps and throat member as shown in Fig. 1 during the process of raising the basket is as follows: As the basket raises, spring 239 biases lever 238 in a clockwise direction. When the free end of lever 238 loses contact with frame member 58, the spring connected end of lever 238 moves similarly upward shifting rod 237 which in turn similarly pivots bracket 234. This movement of bracket 234 imparts a similar movement to the bent ends of rods 226 which in turn causes rods 226 to pivot clockwise as viewed in Fig. 11 thereby moving throat members 224 from the position shown in Fig. 11 to the position shown in Fig. 10. As this occurs, chains 228 pull flap members 227 from the position shown in Fig. 11 to the position indicated in Fig. 10.

A modified type of control means for the hood flaps are shown in diagrammatic form in Fig. 13. In this modification the flaps 227 and throat members 224 are moved out of position by an upward movement of rod 237 the same as in Fig. 6 but instead of effecting such movement by the action of biasing springs, a hand lever 243 is provided and so arranged as to control the position of the three way hydraulic valve 114. Lever 243 is attached to a rock shaft 244 which is pivotally supported in brackets 246 and 247 carried by basket side plate 142 and is provided with a crank arm 248 pivotally connected to rod 237. The lower end of hand lever 243 is universally attached to a link 249 which extends along the pivot axis of basket 69 and is pivotally connected to a crank arm 251 projecting from the adjacent end of a transverse rock shaft 252 mounted in brackets 253 and 254 carried by frame members 58 and 59. Also attached to rock shaft 252 is a crank arm 256 having a universal connection with a link 257 which in turn is universally attached to a crank arm 258 secured to three way valve operating rod 121. A spring 259 is connected at one end to frame member 59 and at its other end to a crank arm 261 forming a part of lever 243. The spring 259 is in dead center position relative to the axis of rock shaft 244 when lever 243 is in its midposition. In other words, spring 259 is an overcenter spring designed to maintain lever 243 in its fully raised or in its fully lowered position.

This modified control system for the three way hydraulic valve, the hood flaps and the throat members provides a positive linkage for moving the flaps and throat members out of the way of possible damage as the basket is raised past the elevating conveyers, and at the same time provides for correctly positioning the three way hydraulic valve to raise or lower the basket, these functions being secured by a simple movement of the single lever 243.

Assuming the cotton harvester is operatively moving through a field of cotton, lever 243 is in its lower position as indicated in Fig. 13 and the throat and flap members are in the position indicated in Figs. 7 and 11, with the upper ends of the throats in bridging relation to the adjacent side of the housings of conveyers 76, 76', respectively, and the three way valve is positioned to place hydraulic ram 118 in communication with pump 112 for controlling the position of the picking units, as desired. It is apparent that if the hydraulic pump is actuated to raise or lower the picking units, no destructive contact will take place between the discharge end of the elevating conveyers and the flaps and throat members as the resulting relative movement of these parts is merely a vertical straight line motion. However, if the basket were to be raised to its discharge position without first moving the throat members 224 and the throat flap members 227 which face the floor extension side of the basket, to their position shown in Fig. 10, a destructive contact would result between the upper end of the elevating conveyer and these flap and throat members as the latter members are carried by the basket and move angularly relative to the elevating conveyers 76, 76'. A raising of lever 243 shifts the flaps facing the floor extension side of the basket and both throat members to the positions indicated in Fig. 10 and shifts the three way hydraulic control valve so that the basket ram 119 is in communication with the hydraulic pump which then can be safely operated to raise or lower the basket. In this connection, it will be noted that although the remaining or offside flaps 225 are hingedly connected to their respective hood structures and spring biased to their operative forwardly extended positions in exactly the same manner as the near side flaps 227 mentioned in the preceding sentence, these offside flaps are not connected to actuating rod 237 and consequently are not shifted to an inoperative position by the raising of the basket or by the manipulation of lever 243. Obviously there is no destructive contact between the offside flaps 225 and the elevating conveyer housings 76, 76' as when the basket is raised these flaps move angularly away from rather than toward such housings. A primary purpose of providing the offside flaps with a biased hinge part is to maintain the flaps positioned in close proximity to the sides of the elevating conveyer housings and yet permit some degree of relative lateral movement therebetween. In addition, such a mounting permits the picking units to be laterally adjusted to conform with different row spacings without first detaching the hood structures from the basket. With the basket in its raised position and the floor extension 162 lowered, power take-off control rod 87 can be manipulated by the operator to establish a driving connection between clutch element 88 and power take-off shaft clutch element 89 whereupon the basket floor conveyer 111 then moves the picked cotton against the basket doors forcing them to an open position, the picked cotton then moving outwardly over the end of the basket floor extension into a suitable vehicle positioned therebelow.

In view of the foregoing it will be appreciated that the construction hereinbefore described for purposes of illustration effectively accomplishes all of the objects previously stated. It should also be understood that while a preferred embodiment of the invention is shown it is not intended to limit the protection to be secured to the herein disclosed details of construction and combination as various modifications within the scope of the appended claims may occur to persons skilled in the art.

It is claimed and desired to secure by Letters Patent:

1. In a cotton harvester having a power operated picking unit, picked cotton elevating means operatively connected to the picking unit, and a basket supported for movement relative to said elevating means and into and out of positions wherein said basket is disposed in adjacent picked cotton receiving relation to the discharge end of said elevating means or in an unloading position remote therefrom, the improvement comprising a throat member mounted on harvester carried supports for movement into an operative position wherein said member is disposed to function as a guide section bridging the space between the discharge end of said elevating means and the basket when the latter is disposed in picked cotton receiving relation to the former, or into an inoperative position affording clearance for the movement of said basket relative to said elevating means, means for moving said throat member to its inoperative position preparatory to effecting a movement of said basket to its unloading position, flap means mounted on harvester carried supports for movement into an operative position vertically bridging the space between the discharge end of said elevating means and said basket or into an inoperative position affording clearance for the movement of said basket relative to said elevating means, and means interconnecting said throat member and flap means for simultaneous movement into and out of said operative and inoperative positions.

2. In a harvester having a power operated harvesting unit, harvested material conveying means operatively connected to said harvesting unit and having an outlet end, and a basket pivotally supported for movement relative to said conveying means and into and out of positions wherein said basket is disposed in adjacent harvested material receiving relation to the discharge end of said conveying means or in an unloading position remote therefrom, the improvement comprising a throat member pivotally mounted on said basket for movement relative thereto into an operative position bridging the space between said outlet end of said conveying means and the basket when the latter is disposed in harvested material receiving relation to the former, or into an inoperative position affording clearance for the movement of said basket relative to said conveying means, and means for moving said throat member to its inoperative position preparatory to effecting a movement of said basket to its unloading position.

3. In a cotton harvester having a power operated picking unit, picked cotton conveying means operatively connected to said picking unit and having an outlet end and a basket pivotally supported for movement relative to said conveying means and into and out of positions wherein said basket is disposed in adjacent picked cotton receiving relation to the discharge end of said conveying means or in an unloading position remote therefrom, the improvement comprising a throat member pivotally mounted on said basket for movement relative thereto into an operative position bridging the space between said outlet end of said conveying means and the basket when the latter is disposed in picked cotton receiving relation to the former, or pivotally moved into an inoperative position affording clearance for the movement of said basket relative to said conveying means, and means for automatically moving said throat member to its inoperative position in effecting a movement of said basket to its unloading position.

4. In a cotton harvester having a power operated picking unit, a picked cotton elevating device operatively connected to the picking unit, and a picked cotton receiving basket, the improvement comprising means for raising and lowering one end of the basket, means for raising and lowering the picking unit, means for selectively operating one of the previously mentioned means, a hood member carried by the basket in proximate relation to the discharge end of the elevating device, a throat member pivotally mounted on said hood and positionable in guide forming bridging relation to the space between the discharge end of the elevating device and said hood member and positionable in spaced removed relation to the discharge end of said elevating device, said throat member being positioned by said last mentioned means, and a flap member pivotally mounted on said hood and positionable in vertical bridging relation to the space between the discharge end of the elevating device and said hood and positionable in spaced removed relation to the discharge end of the elevating device, said flap and said throat member being so connected that both are in bridging position or spaced removed position at the same time.

5. In a cotton harvester having a power operated picking unit, picked cotton elevating means operatively connected to the picking unit, and a basket supported for movement relative to said elevating means and into and out of positions wherein said basket is disposed in adjacent picked cotton receiving relation to the discharge end of said elevating means or in an unloading position remote therefrom, the improvement comprising means for selectively raising or lowering either said basket or said unit, a throat member mounted on harvester carried supports for movement into an operative position wherein said member is disposed to function as a guide bridging the space between the discharge end of said elevating means and the basket when the latter is disposed in picked cotton receiving relation to the former or into an inoperative position affording clearance of said basket relative to said elevating means, said selective means including means for moving said throat member to its inoperative position when said basket is actuated to move to its discharge position and for moving said throat member to its space bridging position when said unit is raised or lowered.

6. In an agricultural machine having a power operated harvesting unit adjustably mounted thereon for vertical movement, harvested material conveying means operatively connected to and carried by the harvesting unit, and a basket supported for movement relative to said conveying means and into and out of positions wherein the basket is disposed in adjacent harvested material receiving relation to the discharge end of said conveying means or in an unloading position remote therefrom, the improvement comprising actuating means for pivotally raising said basket to unloading position or lowering said basket to harvested material receiving position, means bridging the space between the discharge end of said conveying means and said basket when said basket is in harvested material receiving position, and actuating means for raising or lowering said harvesting unit relative to said basket, said bridging means being interconnected with said basket actuating means and said unit actuating means whereby when said basket actuating means are activated to raise or lower said basket said bridging means are activated to position same in a remote relation to the discharge end of said conveying means, and when said unit actuating means are activated to raise or lower the unit said bridging means are positioned in bridging relation to the discharge end of said elevating means.

7. In a cotton harvester having a power operated picking unit, picked cotton conveying means operatively connected to the picking unit, and a basket supported for movement relative to said conveying means and into and out of positions wherein the basket is disposed in adjacent picked cotton receiving relation to the discharge end of said conveying means or in an unloading position remote therefrom, the improvement comprising actuating means for pivotally raising said basket to unloading position or lowering said basket to picked cotton receiving position, means bridging the space between the discharge end of said conveying means and said basket when said basket is in cotton receiving position, said bridging means being interconnected with said basket actuating means whereby when said basket is raised to discharge position said bridging means are moved to a position providing clearance between said basket and the discharge end of said conveying means, and when said basket is lowered to picked cotton receiving position said pivotal means are returned to position bridging the space between the discharge end of said conveying means and said basket.

8. In a harvester, the combination of a harvested material receptacle having a floor member supporting spaced side and end members in receptacle forming relation thereon, one of said end members having a lateral discharge opening in one of said side members and having a bottom edge and side edges extending therefrom, a floor extension pivotally mounted adjacent said floor member on a horizontal axis at said bottom edge of said discharge opening, an endless conveyer encircling said floor member and extension and operable when said extension is positioned in coplanar alignment with said floor member to discharge material from said receptacle over the free end of said extension, means for driving said endless conveyer, door means for said discharge opening pivotally carried by said receptacle and movable to an open material guiding position and to a closed material retaining position, an overcenter spring means carried by said receptacle for releasably retaining said door means in open and closed positions, said floor extension being positionable at an angle to said floor member effective to engage and positively retain said door means in closed position.

9. In a harvester, the combination of a harvested material receptacle having a floor member and a lateral discharge opening adjacent thereto, a floor extension pivotally mounted on a horizontal axis adjacent the lower end of said discharge opening, an endless flexible conveyer element encircling said floor member and said floor extension and operable when said extension is positioned in coplanar alignment with said floor member to discharge harvested material carried by said floor member over the free end of said floor extension, and means mounting said conveyer element on said receptacle including a reciprocable, rotary support and spring means urging said support in conveyer tensioning direction.

10. A harvester comprising, in combination, a pair of rigidly interconnected transversely spaced frame members extending longitudinally of said harvester at opposite sides, respectively, of the latter, a harvested material receptacle overlying said frame members and including a floor member and a pair of spaced side and end members mounted in receptacle forming relation thereon, one of said end members having an apertured end at one side of said harvester for the discharge of harvested material from said receptacle in a direction transversely of said frame members, hinge means pivotally connecting said floor member with the frame member remote from said apertured end on an axis extending longitudinally of said harvester, actuating means for pivoting said receptacle about said axis to an upwardly tilted unloading position and for lowering said receptacle from said unloading position into load transmitting engagement with the frame member at said one side of said harvester, and an endless flexible conveyer encircling said floor member in said receptacle and operable to move harvested material toward said apertured end of said receptacle while the latter is in said upwardly tilted unloading position.

11. In a harvesting machine of the type wherein a harvested material receiving basket is pivotally mounted for back and forth tilting movement so as to raise and lower one side thereof, the combination of rigidly interconnected basket floor and side members defining a material receiving space and a discharge opening thereof having a bottom edge and side edges rising from said bottom edge at said one side of said basket; closure means for said discharge opening including a gate member hinged for swinging movement at said one side of said basket; an extension element for said basket floor member hinged for up and down tilting movement on an axis extending in the direction of said bottom edge; an endless conveyer element encircling said basket floor member and extension element; drive means for said conveyer element operable to effect movement of harvested material through said discharge opening and over said extension element; and latch means cooperable with said floor extension element for releasably retaining the latter in an upwardly tilted position.

12. In a harvesting machine of the type wherein a harvested material receiving basket is pivotally mounted for back and forth tilting movement so as to raise and lower one side thereof, the combination of rigidly interconnected basket floor and side members defining a material receiving space and a discharge opening thereof having a bottom edge and side edges rising from said bottom edge at said one side of said basket, closure means for said discharge opening including a gate member hinged for swinging movement on an axis extending in the direction of one of said side edges; an extension element for said basket floor member hinged for up and down tilting movement on an axis extending in the direction of said bottom edge; an endless conveyer element encircling said basket floor member and extension element; drive means for said conveyer element operable to effect movement of harvested material through said discharge opening and over said extension element; and latch means cooperable with said floor extension element for releasably retaining the latter in an upwardly tilted position.

13. In a harvesting machine of the type wherein a harvested material receiving basket is pivotally mounted for back and forth tilting movement so as to raise and lower one side thereof, the combination of rigidly interconnected basket floor and side members defining a material receiving space and a discharge opening thereof having a bottom edge and side edges rising from said bottom edge at said one side of said basket, closure means for said discharge opening including a pair of gate members hinged for swinging movement on axes extending in the direction of said side edges; means for mounting said gates in selected positions of adjustment including an overcenter spring mechanism operative to maintain said gates in an open material discharge position or a closed material retaining position; an extension element for said basket floor member hinged for up and down tilting movement on an axis extending in the direction of said bottom edge; an endless conveyer element encircling said basket floor member and extension element; drive means for said conveyer element operable to effect movement of harvested material through said discharge opening and over said extension element; and latch means cooperable with said floor extension element for releasably retaining the latter in an upwardly tilted position.

14. A harvester comprising a mobile support, a receptacle mounted on said support and having a material inlet, a harvested material elevating device mounted on said support having an outlet end in spaced registry with said material inlet, means pivotally mounting said receptacle on said support for selective adjustment either to a loading position in which said material inlet aperture is in registry with said outlet end at a predetermined spacing from the latter, or to a tilted unloading position presenting said inlet aperture in nonregistering relation to said outlet end, and material guide means bridging the space between said receptacle and elevating device when the former is in said loading position, said means comprising a throat member pivoted on said receptacle adjacent said inlet for vertical movement relative to the latter, and flap members pivoted on said receptacle adjacent said inlet for lateral back and forth movement relative to the latter.

15. A harvester comprising, in combination, a harvested material elevating device having an outlet end, a receptacle having a material inlet aperture registerable with said outlet end, means pivotally mounting said receptacle on said harvester for selective adjustment either to a loading position in which said inlet aperture registers with said discharge end of said elevating device at a predetermined spacing from the latter, or to tilted unloading position presenting said inlet aperture in nonregistering relation to said discharge end, material guide means pivoted on said receptacle for cooperation with said elevating device so as to bridge the space between the latter and said inlet aperture while said receptacle is in said loading position, actuating means for pivotally moving said receptacle between said loading and unloading positions, and means operatively interconnecting said actuating means and said material guide means so that said guide means will be moved automatically from an operative bridging position to an inoperative retracted position when said actuating means are operated to adjust said receptacle from its loading to its unloading position, and so that said guide means will be moved automatically from said inoperative to said operative position when said actuating means are operated to adjust said receptacle from its unloading to its loading position.

16. A harvester comprising, in combination, a frame structure, a harvested material receptacle including a floor member and spaced side and end members, one of the latter having a discharge opening therethrough, pivot means mounting said floor member on said frame structure for pivotal movement about a horizontal axis extending longitudinally of said harvester, actuating means for selectively adjusting said receptacle about said axis to a loading position wherein said receptacle is in a generally horizontal position and to a tilted discharge position presenting said discharge opening in raised relation to said frame structure, and an endless conveyer encircling said floor member and operable to move harvested material upwards along said tilted floor member and through said discharge opening while said receptacle is in said unloading position.

References Cited in the file of this patent

UNITED STATES PATENTS

| | | |
|---|---|---|
| 796,207 | Harbour | Aug. 1, 1905 |
| 1,912,232 | Wehrhahn et al. | May 30, 1933 |
| 1,952,883 | Nelson | Mar. 27, 1934 |
| 2,233,111 | Roberts | Feb. 25, 1941 |
| 2,359,889 | Bigelow | Oct. 10, 1944 |
| 2,399,718 | Baker et al. | May 7, 1946 |
| 2,518,465 | Hagen et al. | Aug. 15, 1950 |
| 2,635,771 | Black | Apr. 21, 1953 |
| 2,671,298 | Fergason | Mar. 9, 1954 |